(12) United States Patent
Zimmer et al.

(10) Patent No.: US 12,110,178 B2
(45) Date of Patent: Oct. 8, 2024

(54) HIGH DENSITY STORAGE AND RETRIEVAL SYSTEM

(71) Applicant: Intelligrated Headquarters, LLC, Mason, OH (US)

(72) Inventors: Justin J. Zimmer, Dayton, OH (US); William Munnerlyn, Cincinnati, OH (US); Philip Ammar, Maineville, OH (US)

(73) Assignee: Intelligrated Headquarters, LLC, Mason, OH (US)

( * ) Notice: Subject to any disclaimer, the term of this patent is extended or adjusted under 35 U.S.C. 154(b) by 53 days.

(21) Appl. No.: 17/374,436

(22) Filed: Jul. 13, 2021

(65) Prior Publication Data

US 2022/0017303 A1    Jan. 20, 2022

Related U.S. Application Data

(60) Provisional application No. 63/053,164, filed on Jul. 17, 2020.

(51) Int. Cl.
| | |
|---|---|
| *B65G 1/04* | (2006.01) |
| *B61B 10/00* | (2006.01) |
| *B61B 13/00* | (2006.01) |
| *B66F 9/06* | (2006.01) |

(52) U.S. Cl.
CPC .......... *B65G 1/0492* (2013.01); *B61B 10/001* (2013.01); *B61B 13/00* (2013.01); *B65G 1/0435* (2013.01); *B65G 1/0464* (2013.01); *B66F 9/063* (2013.01)

(58) Field of Classification Search
CPC .. B65G 1/0435; B65G 1/0492; B65G 1/0464; B66F 9/063
See application file for complete search history.

(56) References Cited

U.S. PATENT DOCUMENTS

| | | | |
|---|---|---|---|
| 11,492,203 B2 * | 11/2022 | Clark | B65G 1/1378 |
| 2014/0014470 A1 | 1/2014 | Razumov | |
| 2017/0267452 A1 | 9/2017 | Goren et al. | |
| 2018/0148259 A1 | 5/2018 | Gravelle et al. | |

(Continued)

FOREIGN PATENT DOCUMENTS

| | | | | |
|---|---|---|---|---|
| CN | 110775502 A * | 2/2020 | .......... | B65G 1/0492 |
| JP | 08-268538 A | 10/1996 | | |

(Continued)

OTHER PUBLICATIONS

Extended European search report Mailed on Dec. 3, 2021 for EP Application No. 21185676, 12 pages.

(Continued)

*Primary Examiner* — Kaitlin S Joerger
(74) *Attorney, Agent, or Firm* — Alston & Bird LLP (57) ABSTRACT

Various embodiments disclosed herein provide for a storage and retrieval systems, and more specifically to a three dimensional storage and retrieval system in which storage cells featuring multiple storage locations disposed around a central void are stacked in alignment with one another such that the central voids in each stack form a central shaft by which storage/retrieval vehicles can access every storage location from upper and lower track grids above and below the stacked array of storage locations.

14 Claims, 5 Drawing Sheets

(56) References Cited

U.S. PATENT DOCUMENTS

| | | |
|---|---|---|
| 2018/0211857 A1 | 7/2018 | Yoo et al. |
| 2019/0291955 A1 | 9/2019 | Bastian, II |
| 2019/0308856 A1* | 10/2019 | Wright ............... B66F 9/07581 |
| 2021/0130094 A1* | 5/2021 | Ingram-Tedd ......... B65G 1/065 |
| 2022/0002076 A1* | 1/2022 | Austrheim ............. B66C 23/50 |
| 2022/0212868 A1* | 7/2022 | Liu ..................... B65G 1/0464 |
| 2023/0014506 A1* | 1/2023 | Austrheim ............. B62D 63/04 |

FOREIGN PATENT DOCUMENTS

| | | | |
|---|---|---|---|
| WO | 2019/232652 A1 | 12/2019 | |
| WO | 2020/220949 A1 | 11/2020 | |
| WO | WO-2021249865 A2 * | 12/2021 | ........... B65G 1/0471 |

OTHER PUBLICATIONS

EP Office Action Mailed on Apr. 18, 2024 for EP Application No. 21185676, 5 page(s).

* cited by examiner

HIGH DENSITY STORAGE AND RETRIEVAL SYSTEM

RELATED APPLICATIONS

This application is a non-provisional application that claims the benefit of priority to U.S. Provisional Application Ser. No. 63/053,164 filed on Jul. 17, 2020 and entitled "High Density Storage and Retrieval System", the entirety of which is incorporated by reference herein.

TECHNICAL FIELD

The present application relates generally to a high density storage and retrieval system and a robotic retrieval vehicle operable in the high density storage and retrieval system.

BACKGROUND

Warehouses and distribution centers may include storage systems that comprise a series of storage racks that are accessible by the transport devices such as, but not limited to, shuttles, vertical lifts, or stacker cranes that are movable within aisles along the storage racks. These transport devices may be used for storing and retrieving of loads in or from a storage rack of the storage system.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details.

Various embodiments disclosed herein provide for storage and retrieval systems, and more specifically to a three dimensional storage and retrieval system in which storage cells featuring multiple storage locations disposed around a central void are stacked in alignment with one another such that the central voids in each stack form a central shaft by which storage/retrieval vehicles can access storage locations from upper and lower track grids above and within the stacked array of storage locations.

Bins or other storage units contained within a three-dimensional grid structure can be arranged in cells, each of which can have multiple storage units surrounding a central void or space on different sides thereof. This void space can be slightly larger than each storage unit, enabling the unit to be pulled into the void by mechanical means, and allowing access to the bins on one or more sides of the void. The storage units can be stacked within the three-dimensional grid structure, which can be built or expanded to a predetermined footprint. The aligned voids of stacked cells can create vertical shafts spanning between upper and lower tracks of the grid structure on which robotic retrieval vehicles can horizontally travel to and from any given shaft. The robotic retrieval/shuttle vehicles can directly access any storage unit via the vertical shafts.

In traditional implementations, when the robotic retrieval vehicle travels horizontally in or on the structure, the wheels, at the sides of the vehicle can operate along the track for movement in the XY plane. When traveling vertically however, in traditional systems, the wheels retract as the tracks are fixed. The mechanism for retracting the wheels can be costly and prone to malfunction. In an embodiment disclosed herein however, the tracks in the XY plane can have gates or latches that allow the wheels to pass through when traveling vertically without having to retract the wheels. In an embodiment, the gates can be actively actuated to open or close when the robotic retrieval vehicle is traveling vertically. In other embodiments, the gates can be latched, allowing passage of the vehicle in one orientation, but not the other orientation. In another embodiment, the latch mechanism can be a smart mechanism that reverses itself based on sensor data or can be mechanically actuated by a switch or other device that is triggered by one or more components on the robotic retrieval vehicle. In an embodiment, the smart mechanism can change orientation of the latch depending on movement of the shuttle, similar to a crossover switch in a sliding shoe sorter. In various embodiments, the smart mechanism can receive sensor data from one or more sensors and determine where the robotic retrieval vehicle is, which direction it is traveling and other information. The smart mechanism can include an electrical or pneumatic mechanism to adjust the latch orientation. In another embodiment, the latch mechanism can have two actuated modes, "locked" to enable XY travel, and "unlocked" to allow passage, either up or down, of the robotic retrieval vehicle. In an embodiment, the robotic retrieval vehicle can have simple sensors that detect movement or presence of the shuttle to change the mode.

In other embodiments, the wheels could be operated by a swerve drive that enables wheels to swivel and operate in a plurality of directions. Thus, instead of having four wheels to facilitate X-oriented travel, and a second set of four wheels to facilitate Y-oriented travel, the retrieval vehicle can have four wheels total to facilitate travel in both X and Y orientations. With the swerve drive, there could be one drive mechanism to control all the wheels and rotate the wheels and drive the wheels, and in other embodiments, there could be two drive mechanisms, one to steer, one to rotate. In yet other embodiments, instead of eight wheels, there could be four wheels that rotate around the bottom of the robotic retrieval vehicle (or shuttle), rotating 90 degrees to switch between traveling in an X direction or a Y direction. In other embodiments, these wheels can retract to enable the robotic retrieval vehicle to ascend or descend or otherwise travel vertically.

In an embodiment of the present disclosure, instead of having a vehicle mounted drive system to raise and lower the robotic retrieval vehicle, the shafts or the structure of the storage and retrieval system can include a drive mechanism to raise or lower the vehicle. In an embodiment, the shaft or frame can have a chain or belt and a mechanism on the robotic vehicle can engage the chain or belt to facilitate movement of the vehicle up or down in the shaft. In an embodiment, the chain or belt can be driven continuously, or can be turned on or off depending on the path requirements of the robotic retrieval vehicle. In other embodiments, the shafts can be driven in a single direction (e.g., Shaft A can be an ascent shaft, shaft B can be a descent shaft, and then the robotic retrieval vehicle can travel between shafts to ascend or descend. In other embodiments, the belt or chain or other lift mechanism can be reversible and vehicles can ascend or descend in the same shaft. In an embodiment, the vehicle can contain a control system that instructs or gives a command to the shaft to operate the mechanism to raise or lower the vehicle. In other embodiments, the storage and retrieval system can provide instructions/commands to the shaft.

In another embodiment, the robotic retrieval vehicles can include a retractable portion of the vehicle that descends from the main vehicle above a shaft. The descending portion can be suspended using cables or can use a hydraulic system to ascend and descend. In an embodiment, the child portion would have a rigidity that allows the descending portion to rotate and/or grab an item from one of the storage cells. The descending portion can also engage the side walls or tracks of the shaft to steady itself and provide some rigidity. In an embodiment, the shuttle could use a hook to engage a tote to bring tote onto the platform. Controls and power could be on the main shuttle body, or via battery on platform.

In yet another embodiment, the vehicle can include motor driven rollers that can offload a tote into the storage cell. The storage cell can include conveyor rollers that receive the tote and roll the tote into the storage cell. In other embodiments, to retrieve the tote from the storage cell, the MDR on the vehicle can engage the rollers in the storage cell and drive the rollers so that the tote is conveyed onto the vehicle. The engagement mechanism can be via friction or via a toothed gear system or worm drive or other suitable mechanism.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Figure 1A:
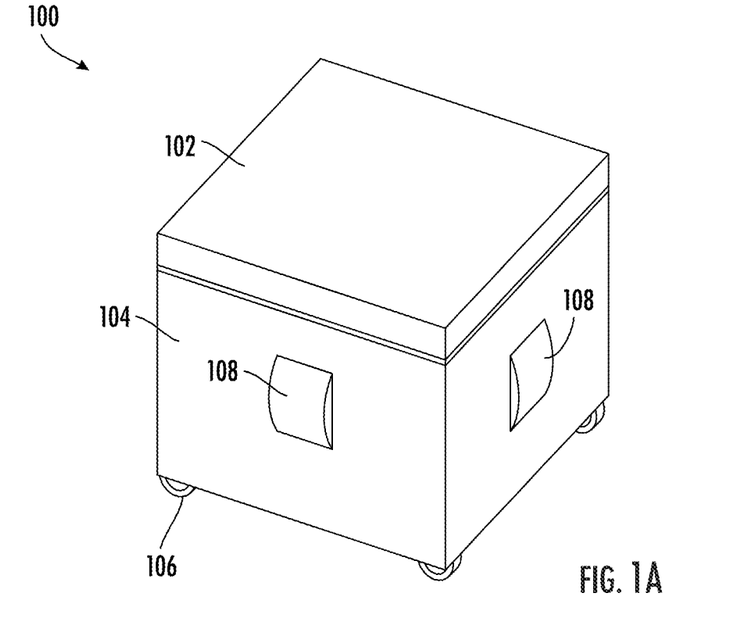
FIGS. 1A and 1B illustrate exemplary views of a robotic shuttle device according to one or more embodiments of the present disclosure.
Figure 1B:
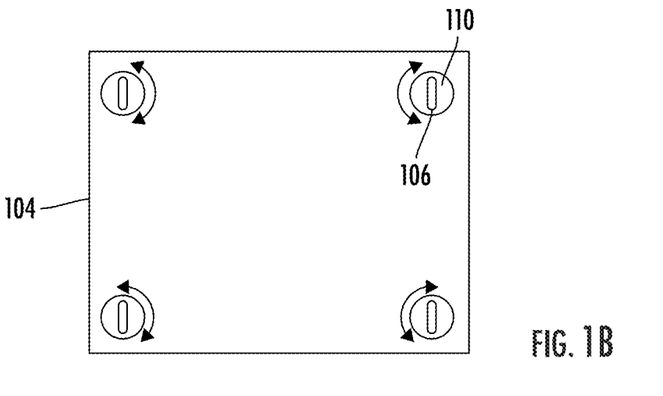

FIGS. 1A and 1B illustrate exemplary views of a robotic shuttle device according to one or more embodiments of the present disclosure. In an embodiment the robotic shuttle device 100 can include an upper portion 102 that can be configured to retrieve and place items, package or totes that are stored in the high density storage system. The top portion 102 can include one or more of a conveyor, a retrieval device, retractable arm, or other device configured to retrieve totes or other items and place them back again from and to storage cells within the storage system.

The robotic shuttle device 100 can also include a lower portion 104 that can include a vertical drive 108 that can be configured to cause the robotic shuttle device 100 to ascend and descend within a shaft within the storage system. In an embodiment the vertical drive 108 can also be located at a corner of the robotic shuttle device 100 to engage one or more tracks in the corners of a shalt in other embodiments. In an embodiment, the vertical drive 108 can be powered and in other embodiments, the vertical drive 108 can be a device configured to engage a drive mechanism in the shaft that can raise or lower the robotic shuttle device.

In an embodiment, the upper portion 102 can rotate relative to the lower portion 104. In this way, the lower portion 104 can remain stationary, while the upper portion 102 rotates to retrieve or place product on different sides of the shaft. To facilitate the rotation within the shaft, the upper portion 102 can have a smaller diameter or cross section than the lower portion 104.

A set of wheels, e.g., wheel 106, can also be mounted on the bottom of the lower portion 104 as seen in FIG. 18. There can be 4 wheels mounted on the bottom of lower portion 104, and the wheels can engage a horizontal track in the XY plan to move the robotic shuttle device 100. The horizontal track can be located at the bottom of, top of, or even in the midst of a storage system, and can enable the robotic shuttle device to move horizontally to different shafts within the storage system.

In an embodiment, instead of having 4 wheels each for Y direction conveyance and 4 wheels for X direction conveyance as in traditional implementations, the robotic shuttle device could have a total of 4 wheels for both y direction and x direction conveyance. The wheels (e.g. wheel 106) can be at respective corners of a bottom rotatable portion of the of vehicle. To change directions, the bottom portion 104 can retract the wheels and rotate 90 degrees to enable the wheels to convey the vehicle in an orthogonal direction. In an embodiment, the vehicle can raise itself slightly in the vertical shaft to facilitate the rotation (e.g., via vertical drive 108), and in other embodiments, the bottom portion can rotate while remaining engaged with the track.

In yet another embodiment, the wheels could be operated by a swerve drive that enables wheels to operate in a multiple directions. Thus, instead of having four wheels to facilitate X-oriented travel, and a second set of four wheels to facilitate Y-oriented travel, the retrieval vehicle can have four wheels total to facilitate travel in both X and Y orientations. With the swerve drive, there could be one drive mechanism to control all the wheels and rotate the wheels and drive the wheels, and in other embodiments, there could be two drive mechanisms, one to steer, one to rotate. In another embodiment, instead of eight wheels, there could be four wheels that rotate around bottom of shuttle, rotating 90 degrees to switch between traveling in a X or Y direction.

Figure 2:
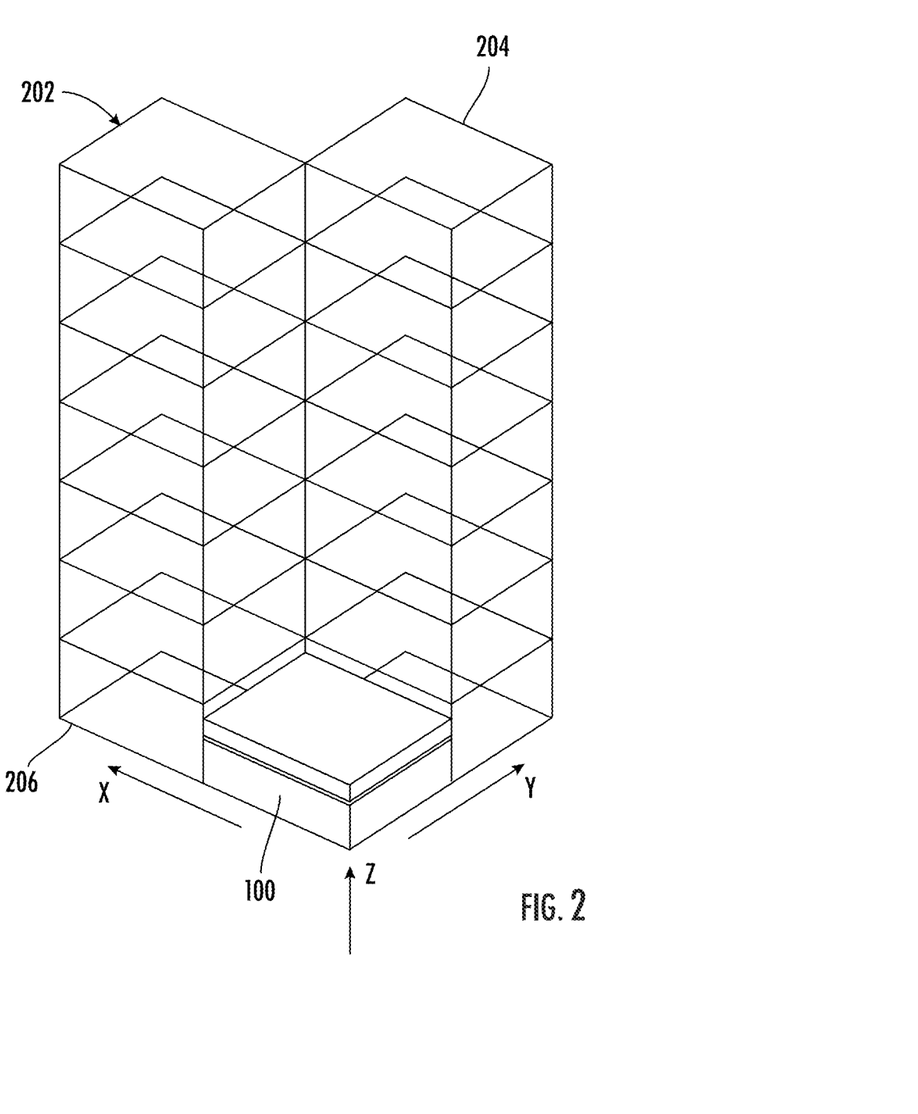
FIG. 2 illustrates a perspective view of a stack of storage cells whose aligned central voids create a vertical shaft through which the bins of each cell are accessible according to one or more embodiments of the present disclosure.

Turning now to FIG. 2, illustrated is a perspective view of a stack of storage cells whose aligned central voids create a vertical shaft through which the bins of each cell are accessible according to one or more embodiments of the present disclosure.

In the embodiment shown in FIG. 2, there is a central void between two stacks of cells 202 and 204. It is to be appreciated, that in other embodiments, there can be 4 stacks of cells around the central void, but in FIG. 2, two stacks are shown for the ease of depiction. The robotic shuttle device 100 can descend into the void and retrieve or place articles or totes from any of the cells in stacks 202 or 204.

At the bottom of the storage system, there can be a track system 206 in the XY plane, and the robotic shuttle device 100 can move along the track system 206 at the bottom of the storage system, as well as along a track system at the top of stacks 202 and 204. In this way, the robotic shuttle device 100 can ascend and descend into a plurality of shafts within the storage system.

In an embodiment, the shaft system can include a drive mechanism such as a belt or chain that a mechanism on the robotic shuttle device 100 can engage with and thus be lowered or raised in the shaft. The belt or chain can raise and or lower the robotic shuttle device to a predefined height in order to access one or more of the storage levels in the stacks 202 and 204. In an embodiment, for the sake of simplicity, some shafts may be unidirectional in their vertical movement such that in certain shafts, robotic shuttles are lowered, and in other shafts, robotic shuttles are raised. In other embodiments, the drive mechanisms in the shafts can be bidirectional, capable of either lowering or raising the robotic shuttle device 100.

Figure 3A:
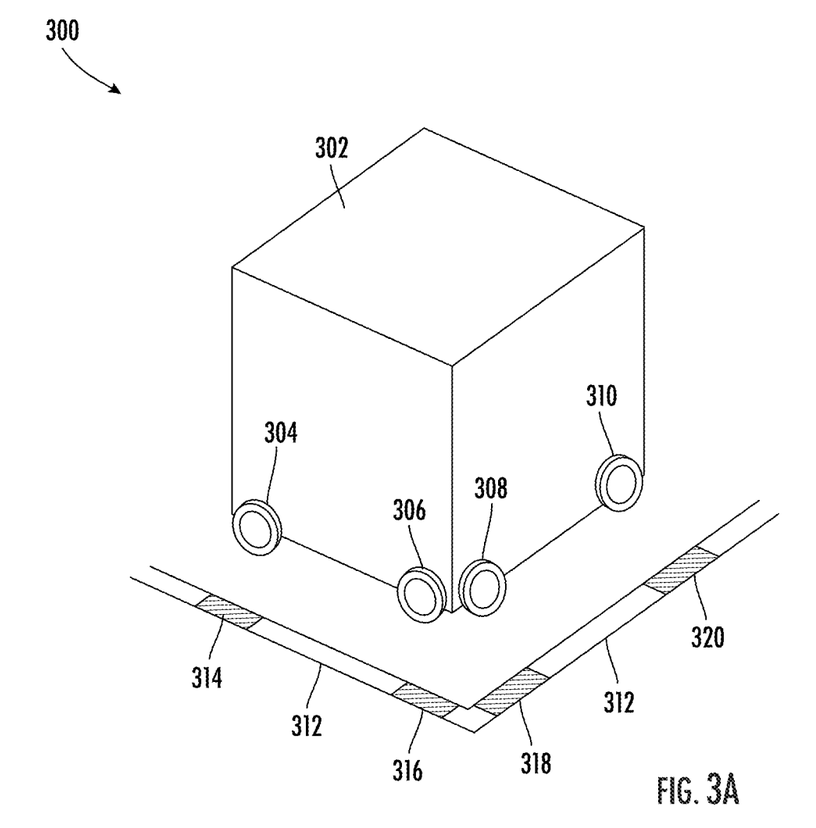
FIGS. 3A-3C illustrate exemplary embodiments of a shuttle track with gates according to one or more embodiments of the present disclosure.
Figure 3B:
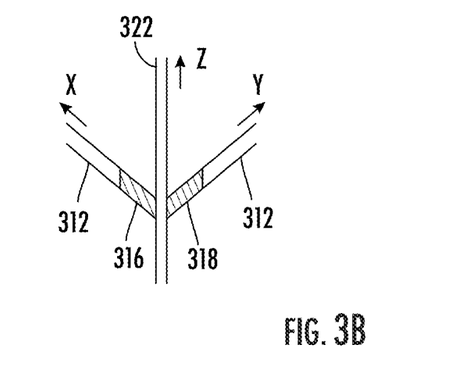
Figure 3C:
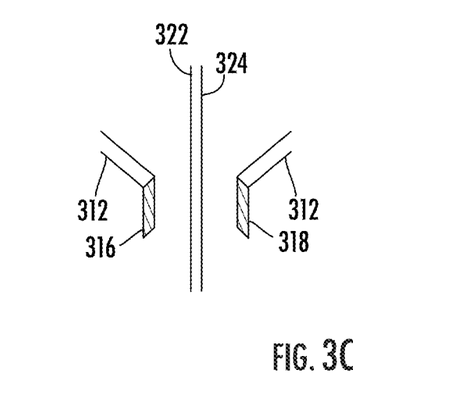

Turning now to FIGS. 3A-3C, illustrated are exemplary embodiments of a shuttle track with gates according to one or more embodiments of the present disclosure.

In an embodiment, robotic shuttle device 302 can include a set of wheels 304, 306, 308, and 310 that protrude from an edge of the robotic shuttle device 302 in order to engage a track 312 to move the robotic shuttle device 302 in a horizontal direction. When travelling vertically, the wheels 304-310, in a traditional implementation, would have to be retracted in order to allow the robotic shuttle device 302 to pass the track 312. In an embodiment of the present disclosure however, the track 312 can comprise gates 314, 316, 318, and 320 to allow wheels 304, 306, 308, and 310 respectively to pass. The gates 314, 316, 318, and 320 can be hinged on either side of the gate, allowing the wheel to pass through when the gate is open.

In an embodiment, the gates 314, 316, 318, and 320 can be actively actuated to open or close when the robotic retrieval vehicle travels vertically and/or when the wheels 304-310 approach the gates 314-320. In other embodiments, the gates can be latched or unidirectional, allowing passage of the vehicle in one orientation, but not the other orientation. This embodiment could be implemented in a unidirectional shaft, allowing the wheels 304-310 to pass through in the direction in which the robotic shuttle device 302 passes, while not allowing passage in the other direction.

In another embodiment, the latch mechanism can be a smart mechanism that reverses itself based on sensor data or can be mechanically actuated by a switch or other device that is triggered by one or more components on the robotic retrieval vehicle. In an embodiment, the smart mechanism can change orientation of the latch depending on movement of the shuttle, similar to a crossover switch in a sliding shoe sorter. In another embodiment, the latch mechanism can have two actuated modes, "locked" to enable XY travel, and "unlocked" to allow passage, either up or down, of the robotic retrieval vehicle. In an embodiment, the robotic shuttle vehicle 302 can have simple sensors that detect movement or presence of the shuttle to change the mode. In other embodiments, as the robotic shuttle device moves vertically, the vertical track 322 can include a switch or sensor 324 that can detect when a shuttle is nearby and open or close the gates (e.g., gates 316 and 318 in FIGS. 3B and 3C) or send a signal that can be used to facilitate opening or closing the gates.

Figure 4:
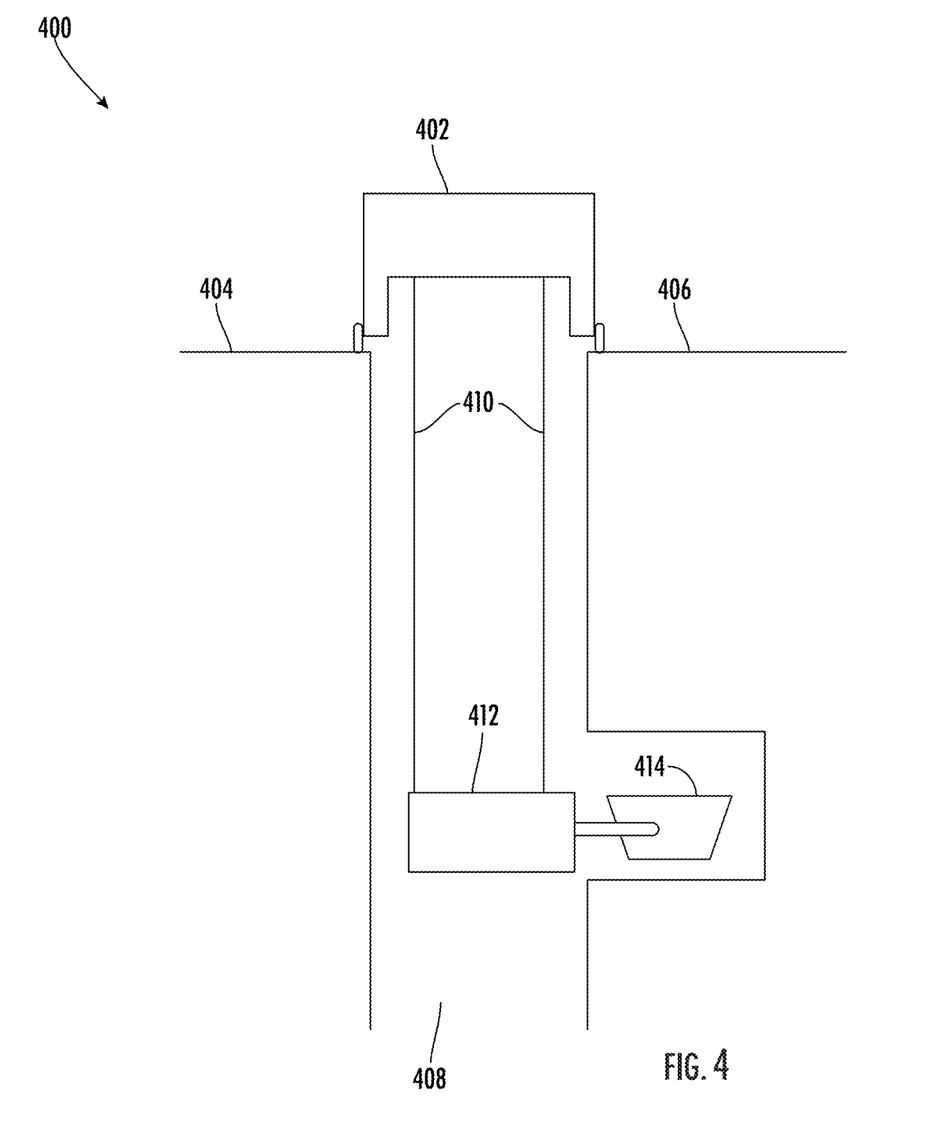
FIG. 4 illustrates an exemplary embodiment of a two-part robotic retrieval device according to one or more embodiments of the present disclosure.

Turning now to FIG. 4, illustrated is an exemplary embodiment of a two-part robotic retrieval device according to one or more embodiments of the present disclosure.

In an embodiment, the robotic retrieval device 402 can move over the top of a storage system (including stacks 404 and 406) and position itself over a shaft 408. The robotic retrieval device 402 can include a shuttle 412 that is able to be lowered within the shaft 408 to retrieve totes, packages or articles within any of the storage cells within stacks 404 and 406. In the embodiment shown in FIG. 4, the shuttle 412 is lowered to retrieve tote 414 from a cell. The tote can be brought on top of, or within the shuttle 412, and then be raised back up to the retrieval vehicle 402.

The descending shuttle 412 can be suspended using cables 410 or can use a hydraulic system to ascend and descend. In an embodiment, the shuttle 412 could have a rigidity that allows the shuttle 412 to rotate and/or grab an item from one of the storage cells.

In an embodiment, the shuttle 412 can also engage the side walls or tracks of the shaft 408 to provide support. In an embodiment, the shuttle 412 could use a hook to engage a tote to bring tote onto the platform. But controls and power could be on the main shuttle body, or via battery on platform.

In an embodiment, the retrieval vehicle 402 can include a motor or other mechanism to lower or raise the shuttle 412, but in other embodiments, the motor or drive mechanism could be located on the shuttle 412 which is capable of lowering or raising itself. Power can be supplied to the shuttle 412 by the cables 410 or can have a separate power line coupled to the retrieval vehicle 402. In other embodiments, the shuttle 412 can be powered via a rail in the shaft 408 or via another power coupling to the storage system.

Figure 5:
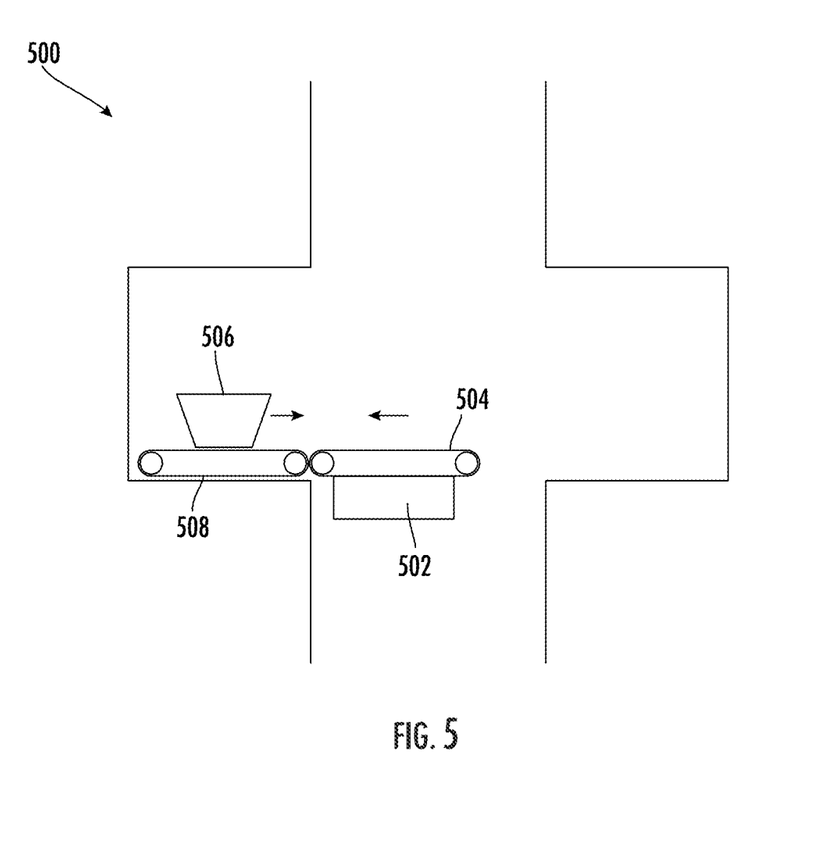
FIG. 5 illustrates an exemplary embodiment of a robotic shuttle with a conveyor according to one or more embodiments of the present disclosure.

Turning now to FIG. 5, illustrated is an exemplary embodiment 500 of a robotic shuttle 502 with a conveyor 504 according to one or more embodiments of the present disclosure.

In an embodiment, the robotic shuttle 502 can include motor driven rollers or conveyor 504 that can offload a tote into the storage cell. The storage cell can also include conveyor or rollers 508 that receive the tote and roll the tote into the storage cell. In an embodiment, the conveyor 504 can engage the conveyor 508 via friction and cause the tote 506 to be loaded onto the conveyor 504. The engagement mechanism can be via friction or via a toothed gear system or worm drive or other suitable mechanism.

In an embodiment, the driving conveyor or motor driven roller can be the conveyor 504 or motor driven roller on the shuttle 502. In other embodiments, the driving roller can be the conveyor 508 or motor driven roller in the cell or storage system, and the conveyor 504 on the shuttle can be unpowered.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A robotic retrieval vehicle comprising:
 a first portion comprising:
  a first mechanism that facilitates vertical movement of the robotic retrieval vehicle along a vertical shaft of a high density storage system, wherein the first mechanism comprises a drive mechanism configured to raise or lower the robotic retrieval vehicle in the vertical shaft, wherein the drive mechanism is positioned at a location other than a corner of the first portion; and
  a second drive mechanism that facilitates lateral movement in the high density storage system, wherein the second drive mechanism comprises a set of four wheels that can maneuver the robotic retrieval vehicle on a rail network in the high density storage system and can maneuver the robotic retrieval vehicle in a first direction and a second direction orthogonal to the first direction; and
 a second portion that is rotatable relative to the first portion.

2. The robotic retrieval vehicle of claim 1, wherein the second drive mechanism rotates a portion of the robotic retrieval vehicle comprising a set of wheels when changing movement from the first direction to the second direction.

3. The robotic retrieval vehicle of claim 2, wherein in response to the second drive mechanism rotating the portion of the robotic retrieval vehicle, the set of four wheels disengage from a first pair of rails and engage a second pair of rails.

4. The robotic retrieval vehicle of claim 1, wherein the drive mechanism of the first mechanism engages a drive system associated with the vertical shaft.

5. The robotic retrieval vehicle of claim 4, wherein the drive system is at least one of a chain or belt drive system.

6. The robotic retrieval vehicle of claim 1, further comprising a motor driven roller configured to offload or onload a tote into a storage cell of the high density storage system.

7. The robotic retrieval vehicle of claim 1, wherein the second portion comprises a conveyor.

8. The robotic retrieval vehicle of claim 1, wherein the drive mechanism of the first mechanism is positioned at a corner of the first portion.

9. The robotic retrieval vehicle of claim 1, wherein the second drive mechanism comprises only the set of four wheels, the set of four wheels comprising only four wheels.

10. The robotic retrieval vehicle of claim 1, wherein each wheel of the set of four wheels is rotatable on a vertical axis relative to a main body of the first portion.

11. The robotic retrieval vehicle of claim 10, wherein the first portion is configured to retract each wheel of the set of four wheels to facilitate rotating each wheel on the vertical axis relative to the main body of the first portion.

12. The robotic retrieval vehicle of claim 10, wherein the first portion is configured to raise the robotic retrieval vehicle in the vertical shaft while rotating each wheel on the vertical axis relative to the main body of the first portion.

13. The robotic retrieval vehicle of claim 1, wherein each wheel of the set of four wheels is operated by a swerve drive that allows the respective wheel to operate in multiple directions.

14. The robotic retrieval vehicle of claim 1, wherein the drive mechanism is powered.

\* \* \* \* \*